US012322303B2

(12) United States Patent
Parker et al.

(10) Patent No.: US 12,322,303 B2
(45) Date of Patent: Jun. 3, 2025

(54) AIRCRAFT TRAINING AID SYSTEMS AND PROCESSES

(71) Applicant: VISIONARY TRAINING RESOURCES, Tampa, FL (US)

(72) Inventors: Richard Parker, The Woodlands, TX (US); Evey Cormican, The Woodlands, TX (US)

(73) Assignee: VISIONARY TRAINING RESOURCES, Tampa, FL (US)

( * ) Notice: Subject to any disclaimer, the term of this patent is extended or adjusted under 35 U.S.C. 154(b) by 0 days.

(21) Appl. No.: 17/746,639

(22) Filed: May 17, 2022

(65) Prior Publication Data

US 2022/0398936 A1 Dec. 15, 2022

Related U.S. Application Data

(60) Provisional application No. 63/210,544, filed on Jun. 15, 2021.

(51) Int. Cl.
*G09B 9/16* (2006.01)
*G06F 3/01* (2006.01)
(Continued)

(52) U.S. Cl.
CPC ............ *G09B 9/165* (2013.01); *G06F 3/013* (2013.01); *G06F 3/04815* (2013.01); *G09B 19/003* (2013.01)

(58) Field of Classification Search
CPC ....... G09B 9/165; G09B 19/003; G06F 3/013; G06F 3/04815
See application file for complete search history.

(56) References Cited

U.S. PATENT DOCUMENTS 9,583,019 B1 * 2/2017 Schwartz ............... G09B 9/206
9,646,417 B1   5/2017 Sowadski et al.
(Continued)

FOREIGN PATENT DOCUMENTS

EP   3 382 676 A1   10/2018
EP   3547287 A1    10/2019

OTHER PUBLICATIONS

International Search Report and Written Opinion dated Aug. 23, 2022 issued in PCT/US2022/033544.
(Continued)

*Primary Examiner* — Malina D. Blaise
(74) *Attorney, Agent, or Firm* — HUNTON ANDREWS KURTH LLP

(57) ABSTRACT

The instant application pertains to a mobile aircraft training system comprising a user interface and a virtual flight deck display operably configured to the user interface. A processor is operably linked to the user interface and the virtual flight deck display. The virtual flight deck display is configured to display a three dimensional representation of an aircraft's controls and indicators from a perspective of an aircraft crew member position. The use interface is configured to identify an interaction between a user and the aircraft's controls and indicators in the three dimensional representation and configured to communicate said interaction to the processor. The three dimensional representation is altered based upon said interaction. The processor is configured to provide audio and video feedback to the user via the virtual flight deck display based upon the identified interaction between the user and the aircraft's controls and indicators in the three dimensional representation.

20 Claims, 27 Drawing Sheets

(51) Int. Cl.
*G06F 3/04815* (2022.01)
*G09B 19/00* (2006.01)

(56) References Cited

U.S. PATENT DOCUMENTS

| | | | | |
|---|---|---|---|---|
| 10,070,123 | B1* | 9/2018 | Yin | G09G 3/2092 |
| 10,529,248 | B2* | 1/2020 | Chavez | G09B 9/302 |
| 10,565,799 | B2 | 2/2020 | Kitain et al. | |
| 10,796,593 | B2 | 10/2020 | Andersen et al. | |
| 2004/0077464 | A1* | 4/2004 | Feldman | A63B 22/0007 |
| | | | | 434/61 |
| 2005/0069839 | A1* | 3/2005 | Denne | G09B 9/165 |
| | | | | 434/29 |
| 2006/0079817 | A1* | 4/2006 | Dewald | A63B 21/4019 |
| | | | | 482/901 |
| 2010/0279255 | A1* | 11/2010 | Williams, II | G09B 9/14 |
| | | | | 434/29 |
| 2011/0238079 | A1* | 9/2011 | Hannaford | A61B 34/76 |
| | | | | 606/130 |
| 2012/0282588 | A1* | 11/2012 | Stevens | G09B 9/04 |
| | | | | 434/365 |
| 2014/0212848 | A1* | 7/2014 | Newman | G09B 9/12 |
| | | | | 434/59 |
| 2014/0302462 | A1* | 10/2014 | Vatcher | G09B 9/12 |
| | | | | 434/55 |
| 2015/0048933 | A1* | 2/2015 | Danieau | G08B 6/00 |
| | | | | 340/407.1 |
| 2015/0061847 | A1* | 3/2015 | Danieau | A63G 31/16 |
| | | | | 340/407.1 |
| 2016/0140862 | A1* | 5/2016 | Van Lookeren Campagne | G09B 9/12 |
| | | | | 434/55 |
| 2016/0195923 | A1* | 7/2016 | Nauseef | A47C 7/72 |
| | | | | 297/344.21 |
| 2016/0303484 | A1* | 10/2016 | Masutti | A63G 31/16 |
| 2016/0320862 | A1* | 11/2016 | Schradin | A63F 13/211 |
| 2017/0025031 | A1* | 1/2017 | Dreyer | G09B 9/12 |
| 2017/0072327 | A1* | 3/2017 | Wach | A63G 31/16 |
| 2017/0151484 | A1* | 6/2017 | Reilly | A63B 69/0024 |
| 2017/0221376 | A1* | 8/2017 | Gosselin | B25J 17/0216 |
| 2018/0089900 | A1* | 3/2018 | Rober | B60K 35/10 |
| 2018/0113312 | A1* | 4/2018 | Jung | A61H 7/00 |
| 2018/0372061 | A1* | 12/2018 | Vamvas | F03B 13/20 |
| 2019/0099678 | A1* | 4/2019 | Khan | A63F 13/44 |
| 2019/0130782 | A1* | 5/2019 | Nissen | G06T 19/006 |
| 2019/0333396 | A1* | 10/2019 | Robinson | G02B 27/017 |
| 2019/0333404 | A1* | 10/2019 | Bicanic | G06F 3/14 |
| 2020/0035117 | A1* | 1/2020 | Biddle | G09B 9/12 |
| 2021/0074173 | A1* | 3/2021 | Liberatore | G09B 9/08 |
| 2021/0381639 | A1* | 12/2021 | Howard | F16M 13/04 |

OTHER PUBLICATIONS

Extended European Search Report issued in related European Application No. EP 22825722.6 mailed Mar. 24, 2025, 9 pages.

* cited by examiner

AIRCRAFT TRAINING AID SYSTEMS AND PROCESSES

CROSS-REFERENCE TO RELATED APPLICATIONS

The present application claims priority to U.S. Provisional Application No. 63/210,544 filed on Jun. 15, 2021 which application is incorporated herein by reference in its entirety.

FIELD OF THE DISCLOSURE

The present disclosure relates to, for example, systems and processes for training personnel to pilot various aircraft using virtual reality headsets and/or other mobile devices without simulating actual flight. More specifically, the present disclosure relates generally to aircraft and to operating aircraft systems controls, indicators and routine normal and non-normal task mastery.

BACKGROUND AND SUMMARY

In learning to operate an aircraft, pilots generally go through flight training. Flight training is a course of study that often includes various types of training. For example, pilots may complete distance learning computer-based training, attend classroom lessons, use paper Flight Deck posters and physical Flight Deck mock-ups, Flight Training Devices, Full Flight Simulators, and fly aircraft under the supervision of experienced pilots. Flight training may be performed for new pilots learning to fly an aircraft or for experienced pilots learning to fly a new aircraft.

Learning to operate an aircraft typically begins with learning detailed systems information and proper operating techniques, and memorizing both normal and non-normal, or emergency tasks and procedures by means of various 2D computer and paper media.

Currently, pilots learn flows, procedures, memory items, and other tasks using paper materials, having little to no access to a functional Flight Deck for training and practice. For example, a pilot may use a poster of an aircraft in which the poster is a mock-up of controls in the cockpit of the aircraft taped to a wall, also known as a "paper tiger" or "cardboard bomber". The pilot may sit in a chair and visualize manipulating the different controls depicted on the poster to perform flows and procedures, also known as "chair flying".

Sometimes a pilot may use a diagram from the Aircraft Flight Manual that gives guidance on the correct order of tasks to complete a procedure from memory or guidance on how to operate systems controls and read indicators. While referencing the diagram the pilot touches the various controls on the poster taped to the wall and imagines how the aircraft controls may respond.

Research has shown that this type of learning with little to no resemblance to the actual Flight Deck environment may lead to very low information retention, also called 'far transfer'. IN contrast, learning in the actual Flight Deck environment, or as close as possible to the actual Flight Deck may lead to significantly higher retention of the task information, also called 'near transfer'.

The type of learning described above, and the resulting memorization unrelated to the actual Flight Deck environment, often results in pilots beginning the Flight Simulation and Training Device phase of training without the necessary knowledge to operate the aircraft systems controls and perform tasks efficiently. This can result in pilots needing to re-learn the same information in the context of the actual Flight Deck environment. Of course, this practice can waste expensive and limited Flight Training Device and Full Flight Simulator time. It would be advantageous to have a method and/or a system that achieves better training outcomes in a time and cost-efficient way.

The methods and systems described herein provide training with a very accurate, near real, 3D interactive representation of the aircraft flight deck along with a guided training and evaluation curriculum. In one embodiment, the application pertains to a mobile aircraft training system comprising a user interface and a virtual flight deck display operably configured to the user interface. A processor is operably linked to the user interface and the virtual flight deck display. The virtual flight deck display is configured to display a three dimensional representation of an aircraft's controls and indicators from a perspective of an aircraft crew member position. The user interface is configured to identify an interaction between a user and the aircraft's controls and indicators in the three dimensional representation and configured to communicate said interaction to the processor. The three dimensional representation is altered based upon said interaction. The processor is configured to provide audio and video feedback to the user via the virtual flight deck display based upon the identified interaction between the user and the aircraft's controls and indicators in the three dimensional representation.

These and other objects, features and advantages of the exemplary embodiments of the present disclosure will become apparent upon reading the following detailed description of the exemplary embodiments of the present disclosure, when taken in conjunction with the appended claims.

BRIEF DESCRIPTION OF THE DRAWINGS

Various embodiments of the present disclosure, together with further objects and advantages, may best be understood by reference to the following description taken in conjunction with the accompanying drawings.

DETAILED DESCRIPTION

Figure 1:
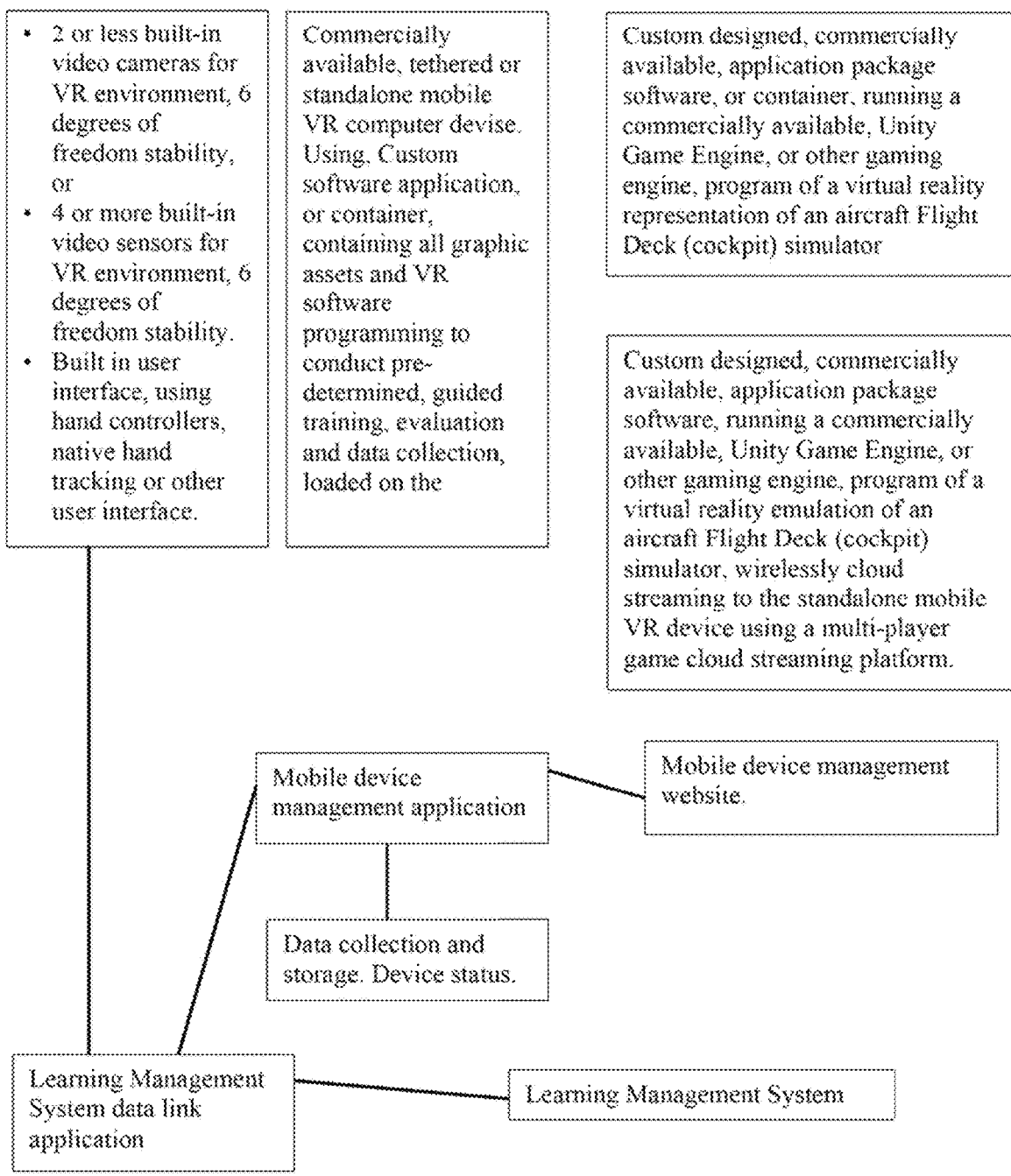
FIG. 1 shows a concept diagram of the interaction between components of a system.
Figure 2:
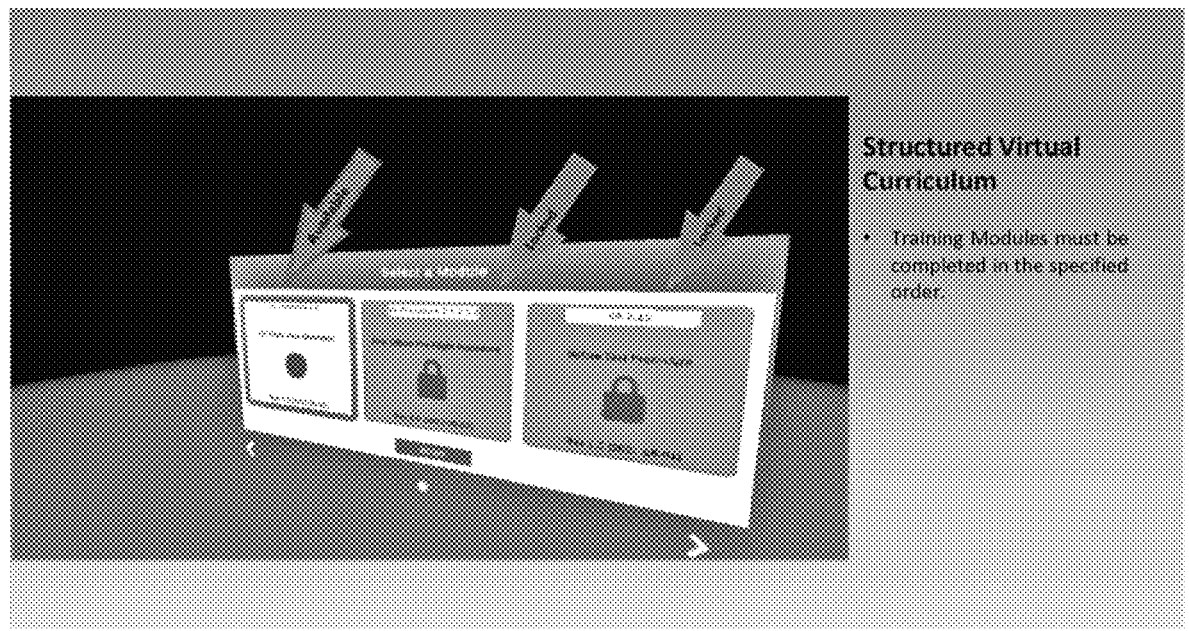
FIG. 2 shows a representative screenshot of a representative system.
Figure 3:
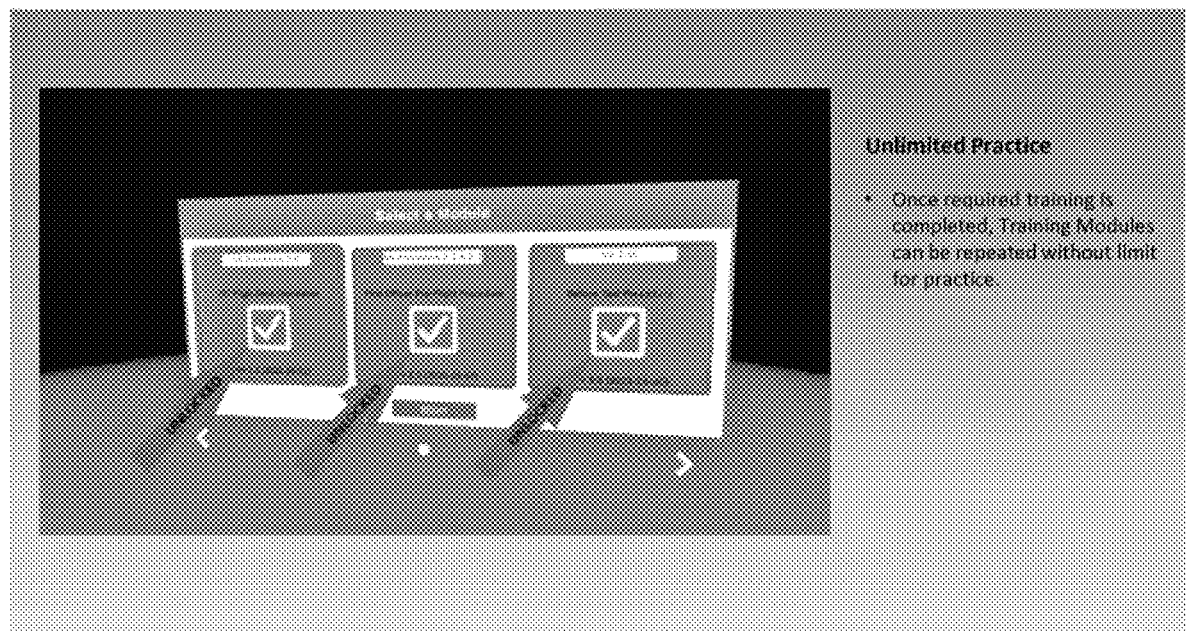
FIG. 3 shows a representative screen shot of a representative system.
Figure 4:
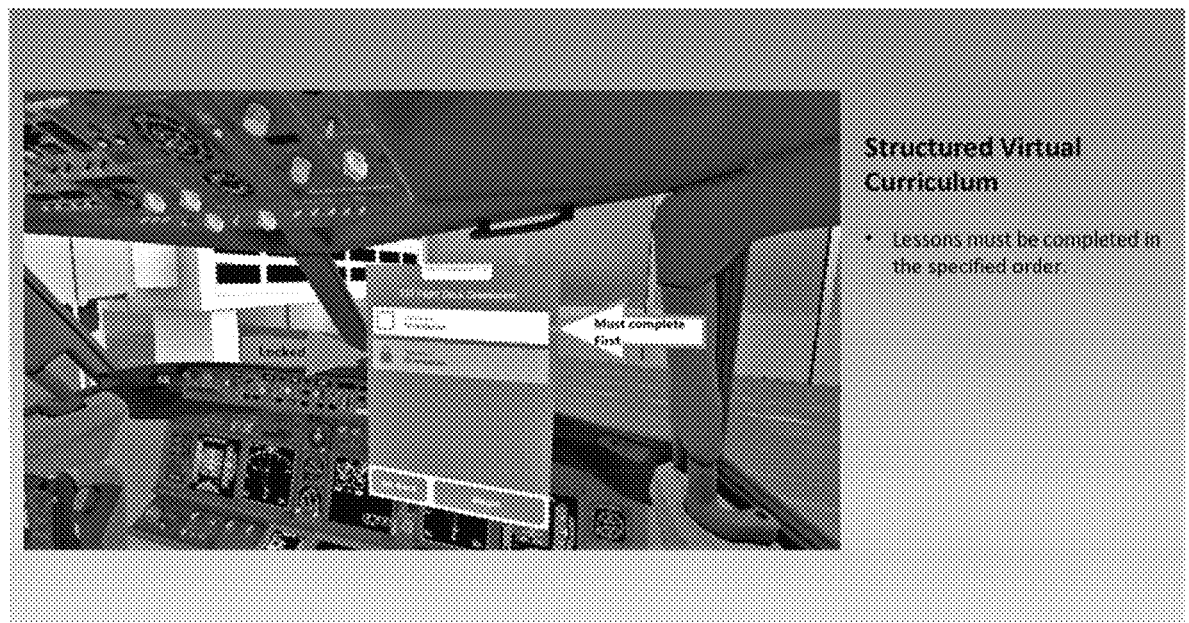
FIG. 4 shows a representative screen shot of a representative system.
Figure 5:
FIG. 5 shows a representative screen shot of a representative system.
Figure 6:
FIG. 6 shows a representative screen shot of a representative system.
Figure 7:
FIG. 7 shows a representative screen shot of a representative system.
Figure 8:
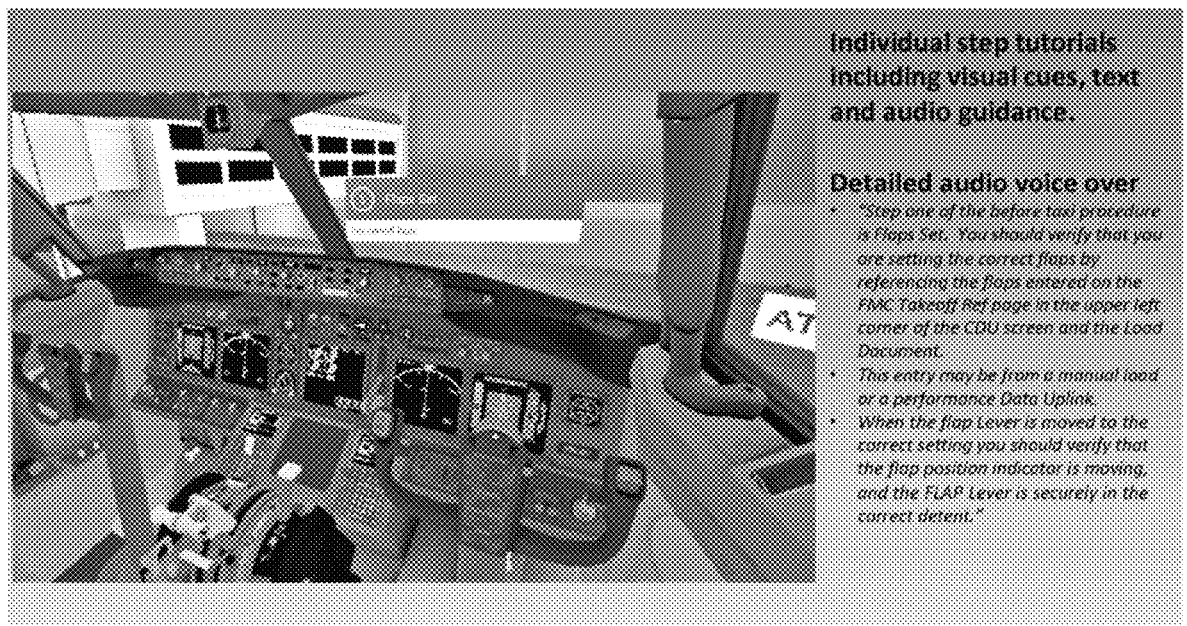
FIG. 8 shows a representative screen shot of a representative system.
Figure 9:
FIG. 9 shows a representative screen shot of a representative system.
Figure 10:
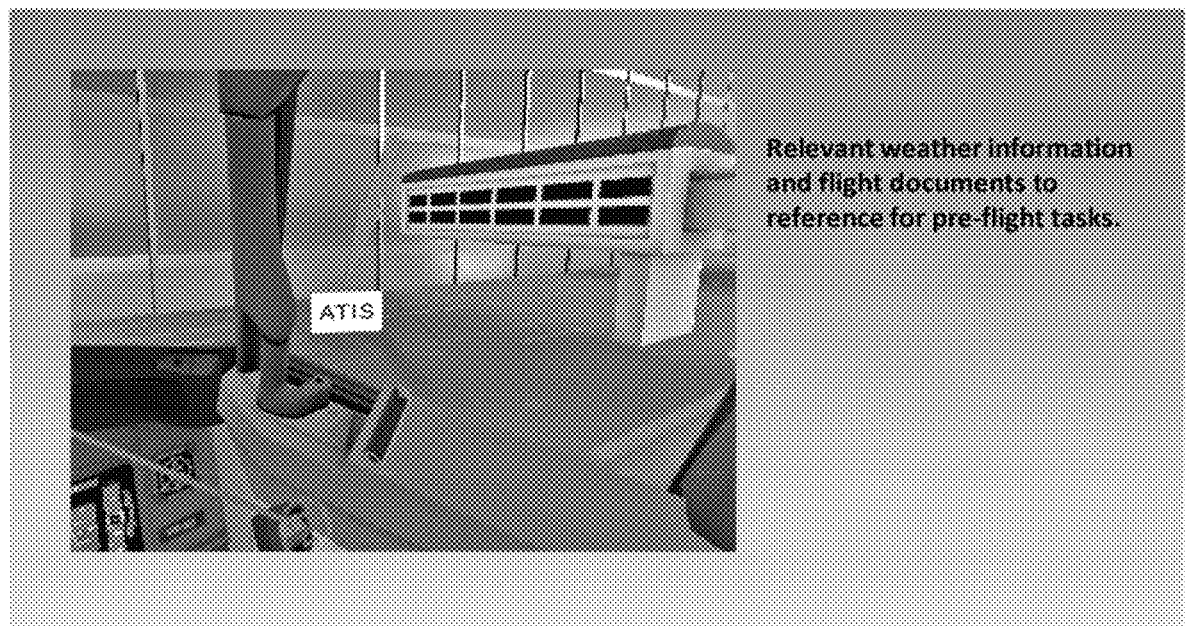
FIG. 10 shows a representative screen shot of a representative system.
Figure 11:
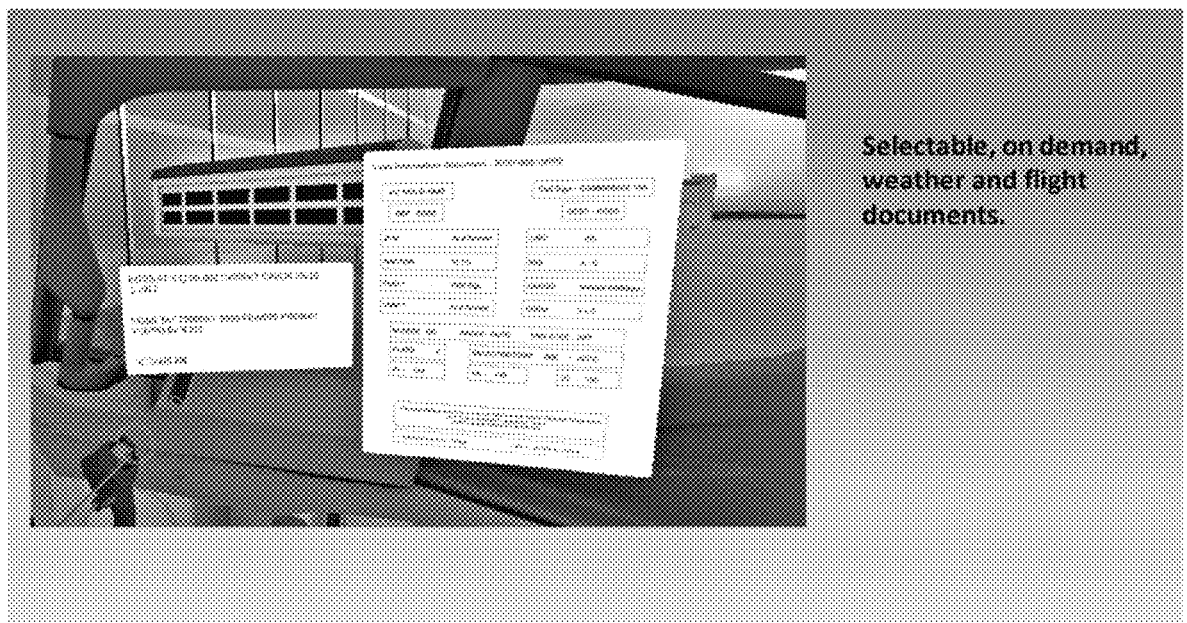
FIG. 11 shows a representative screen shot of a representative system.
Figure 12:
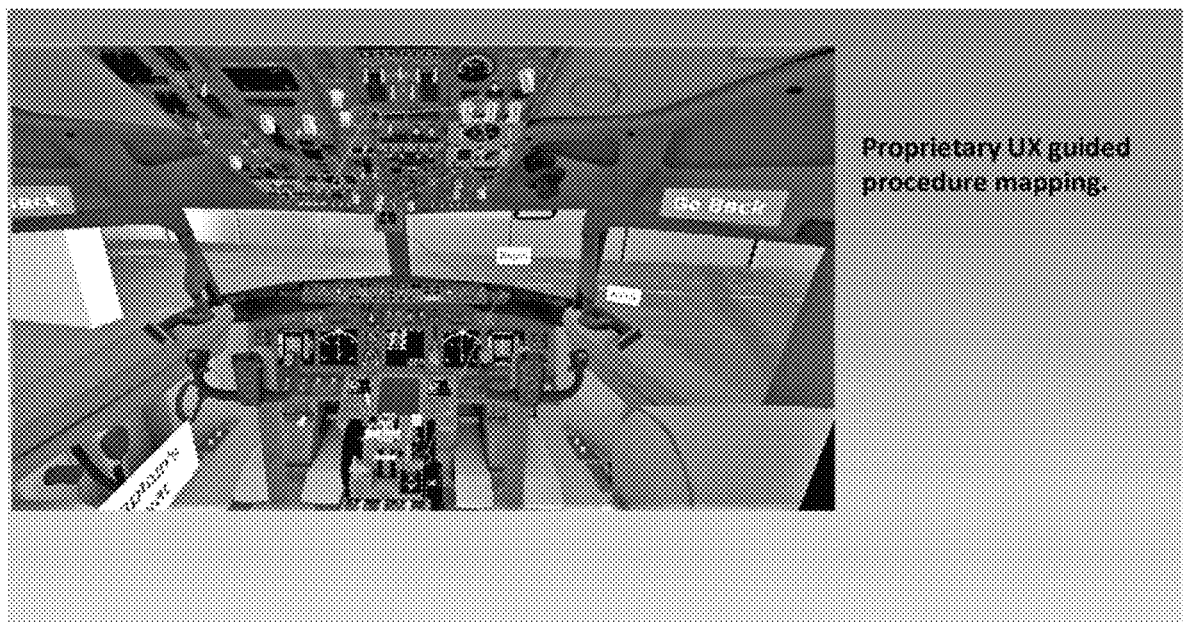
FIG. 12 shows a representative screen shot of a representative system.
Figure 13:
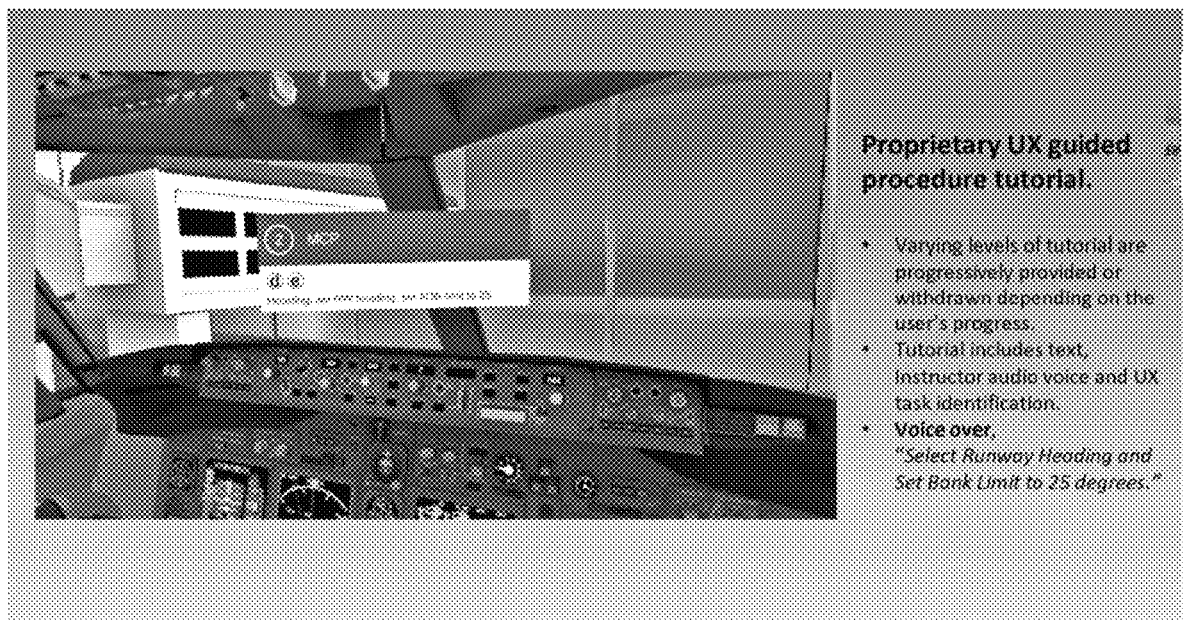
FIG. 13 shows a representative screen shot of a representative system.
Figure 14:
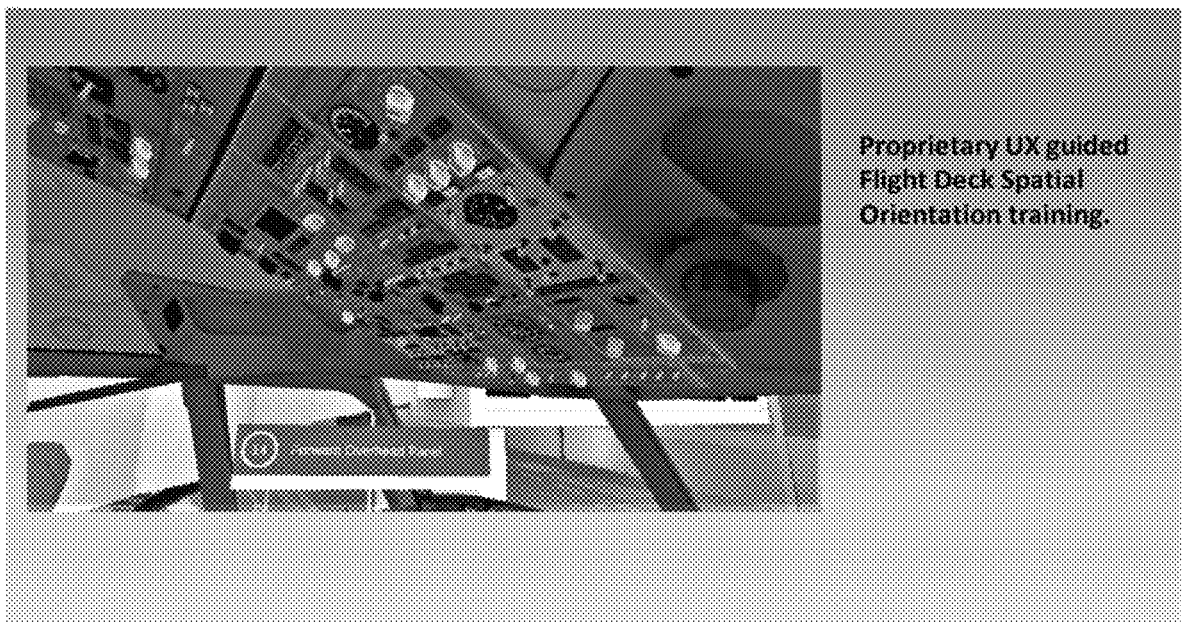
FIG. 14 shows a representative screen shot of a representative system.
Figure 15:
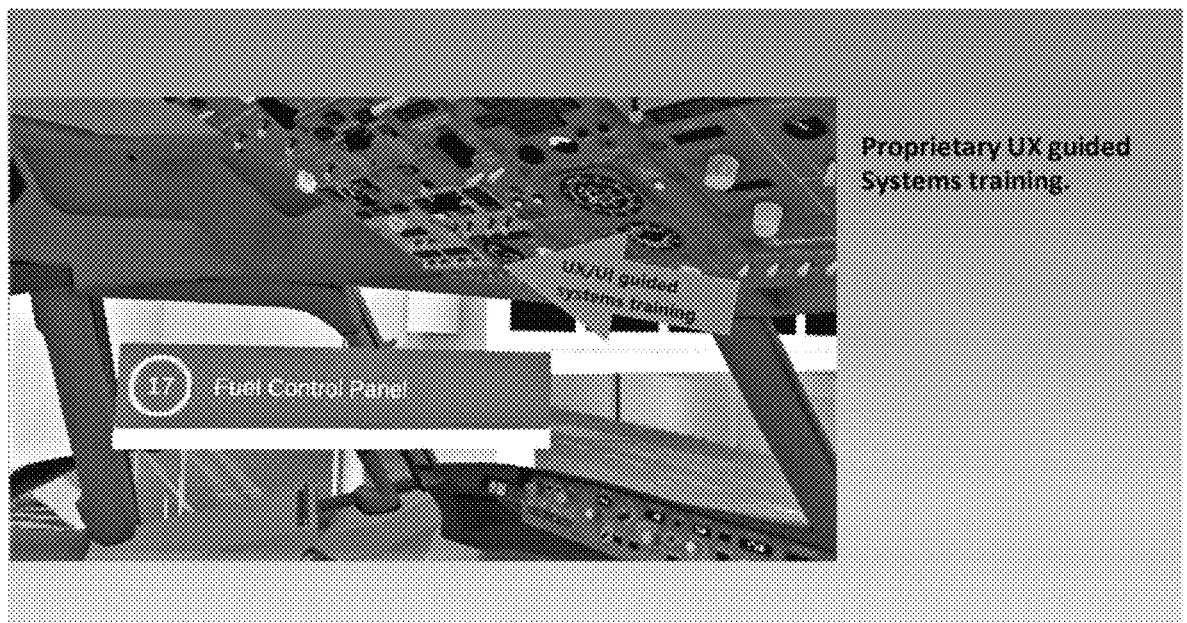
FIG. 15 shows a representative screen shot of a representative system.
Figure 16:
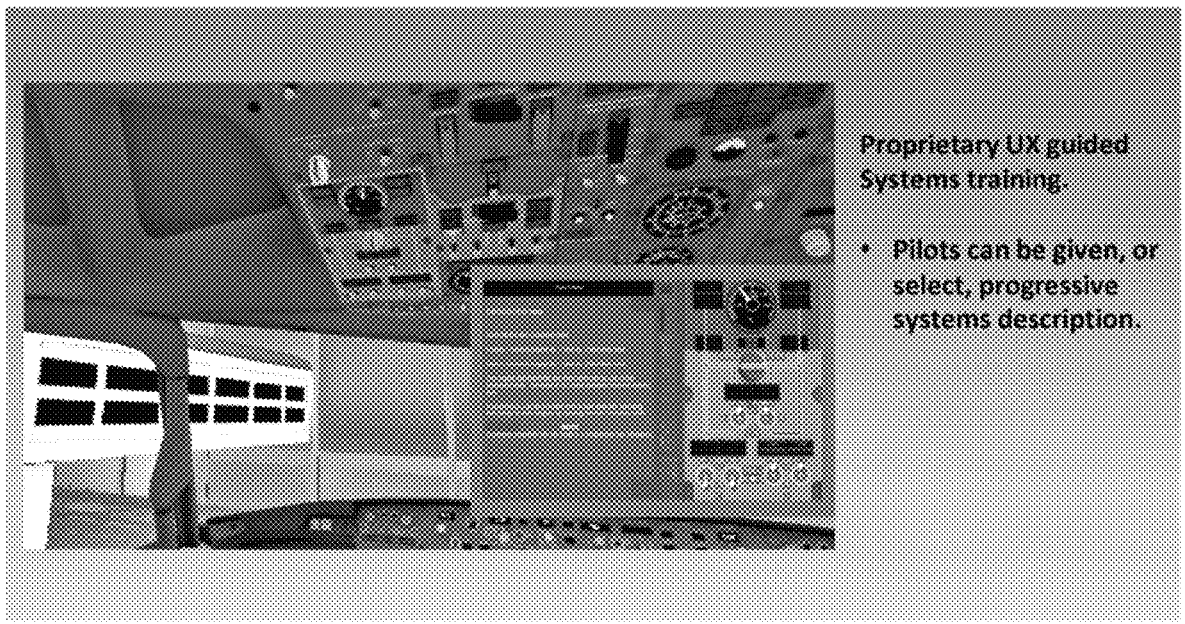
FIG. 16 shows a representative screen shot of a representative system.
Figure 17:
FIG. 17 shows a representative screen shot of a representative system.
Figure 18:
FIG. 18 shows a representative screen shot of a representative system.
Figure 19:
FIG. 19 shows a representative screen shot of a representative system.
Figure 20:
FIG. 20 shows a representative screen shot of a representative system.
Figure 21:
FIG. 21 shows a representative screen shot of a representative system.
Figure 22:
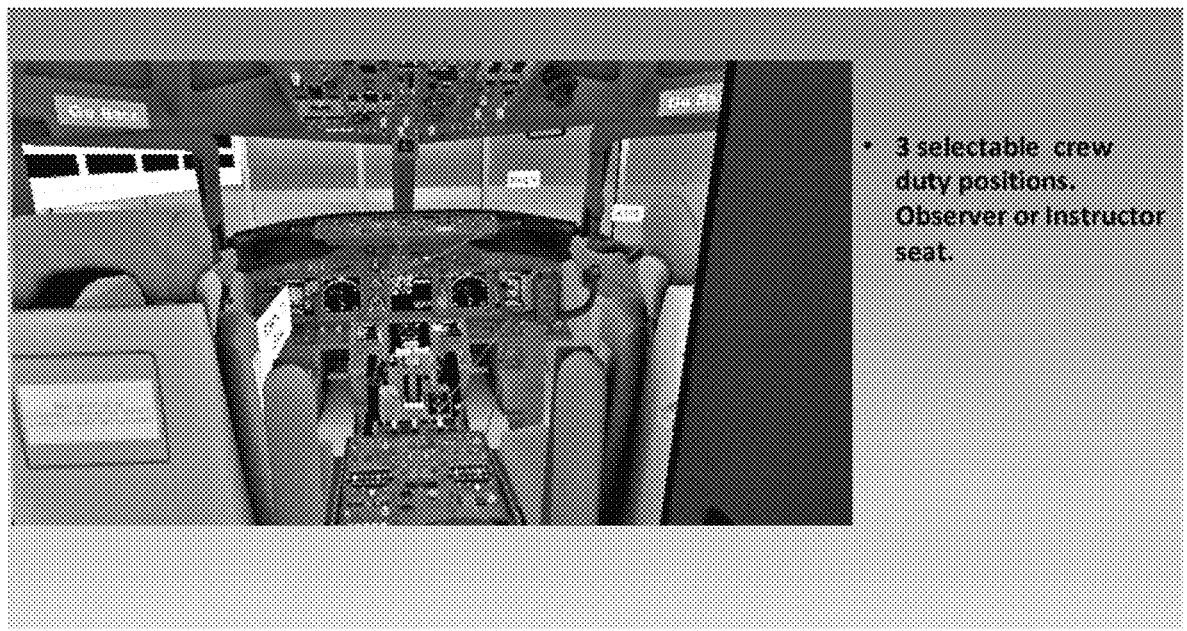
FIG. 22 shows a representative screen shot of a representative system.
Figure 23:
FIG. 23 shows a representative screen shot of a representative system.
Figure 24:
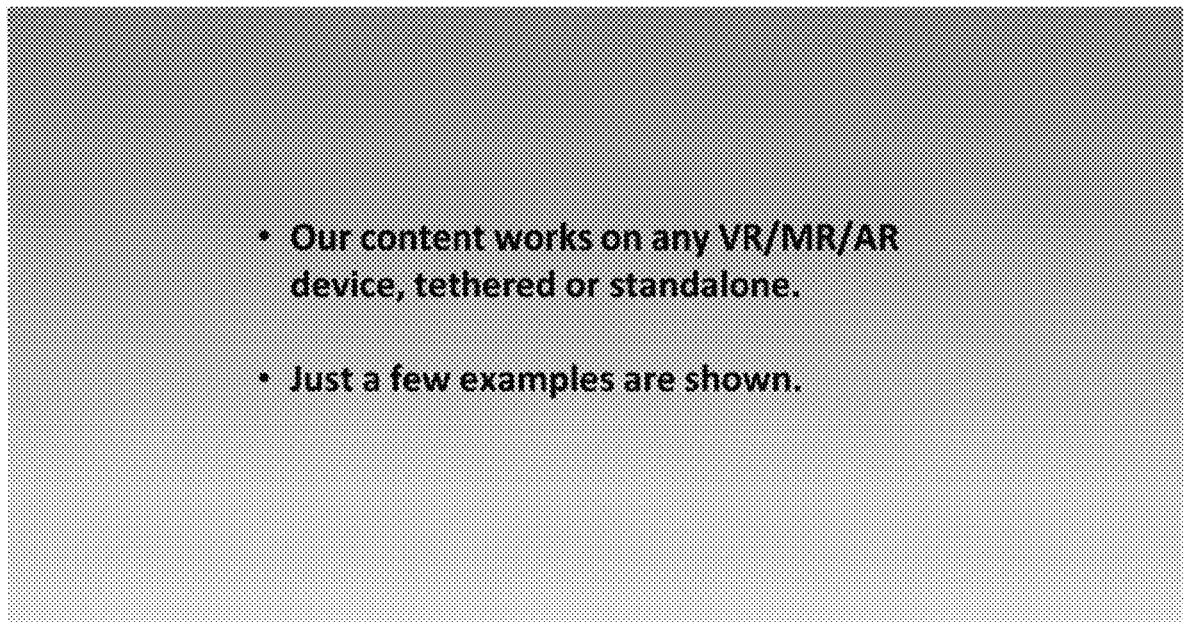
FIG. 24 shows a representative screen shot of a representative system.
Figure 25:
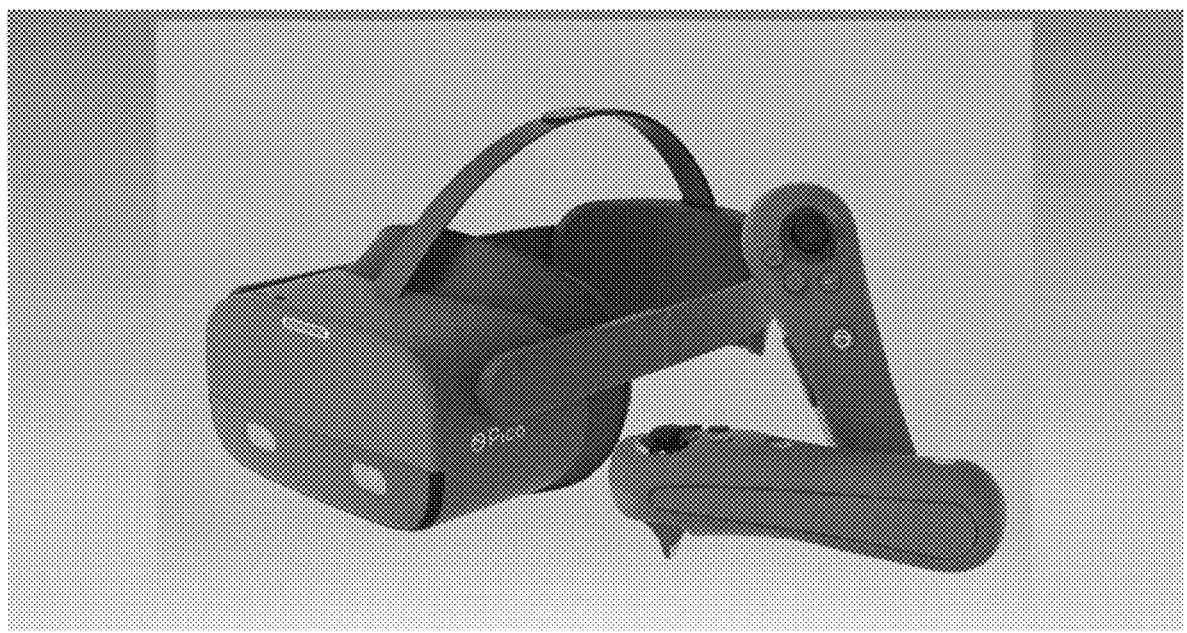
FIG. 25 shows a representative screen shot of a representative system.
Figure 26:
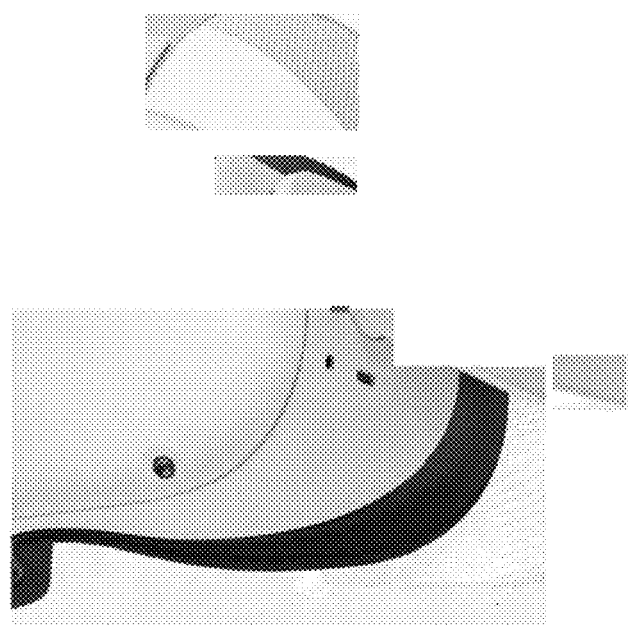
FIG. 26 shows a representative screen shot of a representative system.
Figure 27:
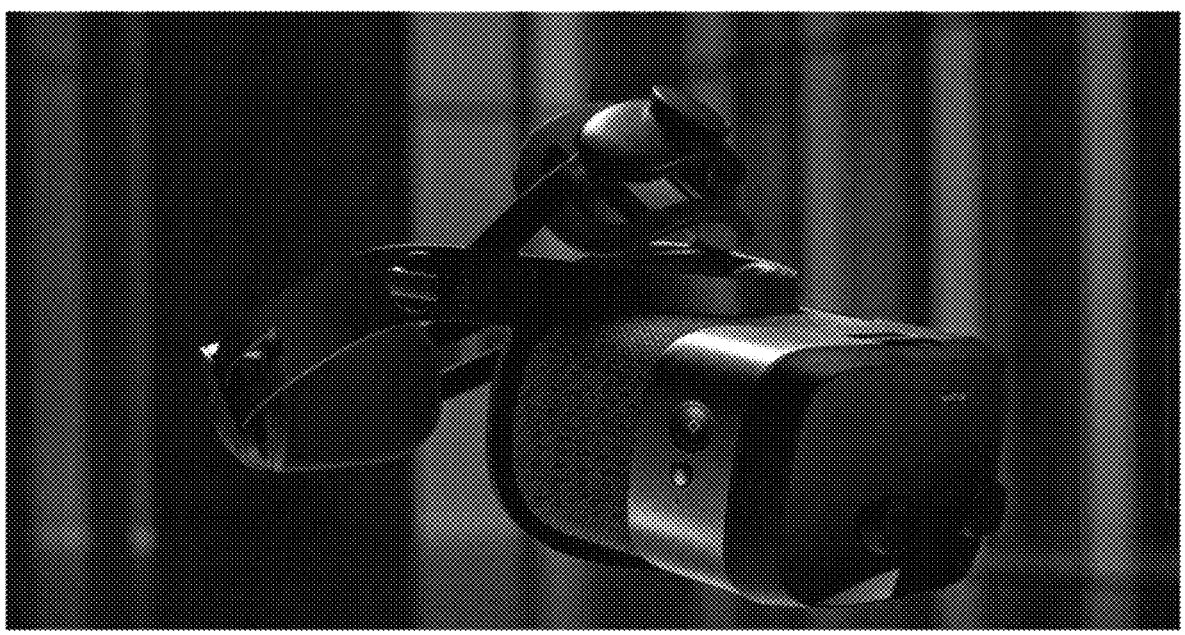
FIG. 27 shows a representative screen shot of a representative system.

The following description of embodiments provides non-limiting representative examples to particularly describe features and teachings of different aspects of the invention. The embodiments described should be recognized as capable of implementation separately, or in combination, with other embodiments from the description of the embodiments. A person of ordinary skill in the art reviewing the description of embodiments should be able to learn and understand the different described aspects of the invention. The description of embodiments should facilitate understanding of the invention to such an extent that other implementations, not specifically covered but within the knowledge of a person of skill in the art having read the description of embodiments, would be understood to be consistent with an application of the invention.

In one embodiment the present application pertains to a mobile aircraft training system. The system may be characterized as a training program and not as a flight simulation training device under 14 CFR § 1.1 as it exists as of the provisional and utility filing date because the systems herein do not simulate flight. That is, the training provided herein does not train on flight, does not have a navigation database, does not allow manual flight control, is not dynamic and therefore does not react like a real airplane to change flight path as in a full flight simulator. Instead, the training systems described herein typically pertain to static, pre-programmed sequence for pre-flight, taxi, and in-inflight normal and non-normal scenarios. More specifically, any in-flight procedure training herein is typically a sequential procedure wherein a proper user selection takes the user to another procedure in the sequence whereas an incorrect user selection does not advance the user. Thus, there is not manual control of an airplane as in a full flight simulator.

The system is generally comprised of at least one user interface, at least one virtual flight deck display, and at least one processor wherein the aforementioned components are operably linked such that remote training on various aircraft operations and functions may be conducted. While the user interface, virtual flight deck display, and processor may be on separate devices in one embodiment they are all contained on a single mobile device such that training may be conducted on the device whether or not the device is connected to a communications network (wireless or wired). The type of mobile device employed in the present system is not particularly limited and includes, for example, devices such as a virtual reality headset, a laptop computer, a tablet computer, or a mobile phone.

The system typically has at least one user interface but may have a second user interface or even a third (or more) user interface. In this manner, the system may allow multiple users to interact to simulate, for example, roles of a captain, first officer, and/or an instructor. Each user interface may be located remote from the other although in some embodiments a single user interface may be configured to support multiple users.

The user interface is operably connected to a virtual flight deck display. The virtual flight deck display is typically on at display of a mobile device and configured to display a three dimensional representation of an aircraft's controls and indicators. These controls and indicators vary depending upon the specific aircraft. Thus, in some embodiments the system may comprise one, two, or three or even more different virtual flight decks wherein each virtual flight deck corresponds to a different type of aircraft, e.g., Boeing 737, 747, 777, 787, Airbus A318-A320 and A380. In this manner a user may select the specific aircraft/flight deck upon which the user desires training.

Typically, the three dimensional representation of an aircraft's controls and indicators are displayed from a typical perspective of an aircraft crew member position, e.g, captain, first officer, jump seat, or in some embodiments from a perspective between a captain and first officer so that the training is useful for both captain and first officer positions. In some embodiments the virtual flight deck display offers six degrees of freedom such that there are six directions which the user's head can move in three dimensional space, i.e., rolling, pitching, yawing, elevating, strafing, and surging.

The perspective of an aircraft crew member's position to the virtual flight deck display may vary but in some embodiments the relative position is fixed between the user and the virtual flight deck. Fixing the virtual flight deck display to a physical space surrounding the user may be accomplished in any convenient manner. In some embodiments one, two, three, four, five, six, seven, or even more cameras may be employed in fixing the virtual flight deck display to a physical space surrounding the user. Such cameras may be of any convenient type and can be affixed to or embedded in a mobile device used for display, e.g., virtual reality headset.

The user Interface may be configured to identify an interaction between a user and the aircraft's controls and indicators in the three dimensional representation and to communicate said interaction to the processor. In this manner the three dimensional representation is altered based upon said interaction. For example, a user may use his or her hand to move a virtually displayed switch or control from off to on and the user interface identifies and communicates the movement to the processor which in turn alters the display to show the switch or control moved from off to on. The interaction and communication may be accomplished in any convenient manner so long as the user's interaction with the virtual flight deck display is generally accurately represented.

The processor is configured to provide audio and video feedback to the user based upon the identified interaction between the user and the aircraft's controls and indicators in the three dimensional representation. Such feedback is typically provided via the virtual flight deck display based upon the identified interaction between the user and the aircraft's controls and indicators in the three dimensional representation. For example, if the identified reaction was a proper reaction an indication of such may be made via video, audio, or both on the display. Similarly, if the identified reaction was not proper, then there may be no indication or alternatively there could be an indication to notify the user that it was improper via video, audio, or both on the display.

The identified interaction between a user and the aircraft's controls and indicators in the three dimensional representation is not particularly limited and may be, for example, movement of a user's body part, the user's movement of a controller or joystick, and/or any combination thereof. The identified interaction between a user and the aircraft's controls and indicators in the three dimensional representation may comprise a user's hand or arm movement, a user's eye movement, a user's movement of a controller or joystick operably linked to the system, or any combination thereof.

If desired memory may be included in the processor or separate and is operably connected to the system. The memory tray be configured to record the interaction or series of interactions between the user and the aircraft's controls and indicators. In this manner an evaluation may be provided to the user based on the user's proper and/or improper recorded interactions. Unlike full flight simulators that use a briefing package as part of an evaluation, the instant system may contemplate a pass/fail evaluation and/or be enabled for adaptive learning and in some embodiments the system may be configured for adaptive learning conducted in real time.

The system may further be configured to collect, store, and analyze data relating to a user's eye movement to provide an evaluation to the user based upon the user's eye movement. Additionally or alternatively, the system may be configured to use real-time eye tracking and visual and audio directions to train a user or users specific gaze actions to complete visual only tasks as required as part of normal, non-normal, and/or emergency procedures.

While eye movement monitoring or tracking may be accomplished in any convenient manner in some embodiments a camera or other eye movement sensor may be located on the device housing the user interface and/or other system components. For example, an eye movement sensor may be placed inside a virtual reality headset and configured to transmit data concerning eye movements in relation to the aircraft's controls and indicators and/or interaction or series of interactions between the user and the aircraft's controls and indicators. The user can then potentially be evaluated based upon proper eye movement to the proper aircraft control at the proper time. Many routine, critical tasks that pilots mast complete do not require physical interaction with the aircraft systems controls, but visual verification that certain tasks result in very specific indications and visual only checks of systems indications. Therefore, as described above in some embodiments eye tracking hardware and software are integrated and used to train and validate visual only task completion by monitoring, for example, a user's eye movement.

If desired, the system may further comprise a second user (or even a third) interface operably connected to the user interface, the processor, and the virtual flight deck display. In this manner the training system may provide training to a captain, first officer, and/or a third user in aspects such as crew coordination training, crew resource management training, threat and error management, or any combination thereof. The first, second, and/or third user can interact with the virtual flight deck display, with each other, and/or potentially with a control tower, simultaneously to simulate more realistic crew interaction and duties of each crew member within a cockpit. The second and/or third user interface may be similarly connected to the system and have similar features as described above for the user interface. That is, the second and/or third user's interactions or series of interactions with the three dimensional representation of the aircraft's controls and indicators may be used to alter the three dimensional representation, audio or video feedback may be provided to the second and/or third user, and the interactions may be recorded for evaluation purposes or otherwise. Similarly, the system may be configured such that a second and/or third user's eye movement may be tracked and used for evaluation, training, or other purposes.

The content of the training system may vary widely depending upon the skill level of the user, the virtual flight deck controls, and desired outcome. In general, training content may be loaded locally on the device used for the system, e.g., virtual reality headset, in the form of an app or a program. Alternatively, training content can be streamed wirelessly or over a wire to the desired device and in some embodiments a remote content management program may be employed to remotely add, delete, or alter training content on a device. The training content may be developed using custom software and/or commercially available software such as UNITY™ or UNREAL ENGINE™, to program application containers or packages.

In some embodiments, training content involves configuring the virtual flight deck display to display a guided sequence of two or more proper interactions between the user and the aircraft's controls and indicators in the three dimensional representation. Of course, the same or similar content may be provided to a second or third user if the system is configured for additional users. In some embodiments the user may complete each interaction and obtain immediate feedback after each interaction. In other embodiments the user may complete the entire sequence before receiving feedback. The displayed guided sequence may comprise audio, video, or both.

If desired, the training content may comprise the virtual flight deck display providing audio and/or video instruction on proper interaction between a user and the aircraft's controls and indicators in the three dimensional representation. In some embodiments the system may comprise a video and audio link from a full flight simulator. In this manner a user may view recorded full flight simulator sessions to prepare for such a session.

The training content may be structured in any convenient manner. For example, training modules requiring various levels of expertise may be provided such that they must be completed in a specified order before the next module is unlocked. For example, in some embodiments "737 flight deck orientation module 1" must be successfully completed and then "first officer pre-flight procedure module 2" and then "before taxi procedure module 3". Once successfully completed training modules may be available for practice.

Lessons within each module may be provided in a specific order, e.g., a structured virtual curriculum. The lessons may include, among other items, a unique user experience design (UX) to guide procedure mapping which in some embodiments includes spatial orientation training. In some embodiments the levels of tutorial (text, instructor voice, and/or UX task identification on virtual flight deck display) are progressively provided to the user or withdrawn depending upon a user's progress. That is, the content provided to the user may adapt in real time to the user's abilities in order to most effectively train the user. The training progress is nearly continuously monitored in some aspects. Progress evaluation checks may be included to review procedures or scenarios within a chapter or even within a lesson.

The system described above may be configured to link to one or more observers located locally or remotely. Such observers may view the training in real time for evaluation or learning purposes. The observer link or links may include functionality for chat, questions, or comments if desired.

The attached powerpoint presentation show representative screen shots and further explanation of certain potential embodiments.

EMBODIMENTS

1. A mobile aircraft training system comprising: a user interface; a virtual flight deck display operably configured to the user interface; and a processor operably linked to the user interface and the virtual flight deck display; wherein the virtual flight deck display is configured to display a three dimensional representation of an aircraft's controls and indicators from a perspective of an aircraft crew member position; wherein the user interface is configured to identify an interaction between a user and the aircraft's controls and indicators in the three dimensional representation and to communicate said interaction to the processor and wherein the three dimensional representation is altered based upon said interaction; and wherein the processor is configured to provide audio and video feedback to the user via the virtual flight deck display based upon the identified interaction between the user and the aircraft's controls and indicators in the three dimensional representation.

2. A mobile aircraft training system of embodiment 1 wherein the virtual flight deck display is further configured to display a guided sequence of two or more proper interactions between the user and the aircraft's controls and indicators in the three dimensional representation.

3. The mobile aircraft training system of embodiment 2 wherein the display of the guided sequence comprises audio and video.

4. The mobile aircraft training system of embodiment 1 wherein the mobile aircraft training system does not simulate flight.

5. The mobile aircraft training system of embodiment 1 wherein the system further comprises a second user interface operably connected to the user interface, the processor, and the virtual night deck display such that the training system provides crew coordination training, crew resource management training, threat and error management, or any combination thereof.

6. The mobile aircraft training system of embodiment 1 wherein the virtual flight deck display, the user interface, and the processor are housed in a mobile device selected from a virtual reality headset, a laptop computer, a tablet computer, or a mobile phone.

7. The mobile aircraft training system of embodiment 1 wherein the virtual flight deck display comprises six degrees of freedom.

8. The mobile aircraft training system of embodiment 1 wherein the perspective of an aircraft crew member position to the virtual flight deck display is fixed between the user and the virtual flight deck.

9. The mobile aircraft training system of embodiment 1 wherein the system comprises from one to seven cameras configured to fix the virtual flight deck display to a physical space surrounding a user.

10. The mobile aircraft training system of embodiment 1 wherein the processor comprises a memory configured to record the interaction between user and the aircraft's controls and indicators.

11. The mobile aircraft training system of embodiment 1 wherein the virtual flight deck display is further configured to display a guided sequence of two or more proper interactions between the user and the aircraft's controls and indicators in the three dimensional representation and wherein said guided sequence is a program on a mobile device selected from a virtual reality headset, a laptop computer, a tablet computer, or a mobile phone.

12. The mobile aircraft training, system of embodiment 1 wherein the virtual flight deck display is further configured to display a guided sequence of two or more proper interactions between the user and the aircraft's controls and indicators in the three dimensional representation and wherein said guided sequence is streamed to a mobile device selected from a virtual reality headset, a laptop computer, a tablet computer, or a mobile phone.

13. The mobile aircraft training system of embodiment 1 wherein the virtual flight deck display is further configured to provide audio and video instruction on proper interaction between a user and the aircraft's controls and indicators in the three dimensional representation.

14. The mobile aircraft training system of embodiment 1 wherein the processor comprises a memory configured to record the interaction between user and the aircraft's controls and indicators and wherein the system is further configured to provide an evaluation to a user based upon the recorded interaction.

15. The mobile aircraft training system of embodiment 1 wherein the system is configured to collect, store, and analyze data relating to a user's eye movement to provide an evaluation to the user based upon the user's eye movement.

16. The mobile aircraft training system of embodiment 1 wherein the system further comprises a second user interface operably connected to the user interface, the processor, and the virtual flight deck display wherein the system is configured to collect, store, and analyze data relating to a second user's eye movement to provide an evaluation to the second user based upon the second user's eye movement.

17. The mobile aircraft training system of embodiment 1 wherein the system is configured for adaptive learning and wherein said adaptive learning is conducted in real time.

18. The mobile aircraft training system of embodiment 1 wherein the identified interaction between a user and the aircraft's controls and indicators in the three dimensional representation comprises a user's hand movement, a user's eye movement, a user's movement of a controller operably linked to the system, or any combination thereof.

19. The mobile aircraft training system of embodiment 1 wherein the system further comprises a video and audio link from a full flight simulator to enable a user to view recorded full flight simulator sessions.

20. The mobile aircraft training system of embodiment 1 wherein the system is operably linked to a remote content management program.

21. The mobile aircraft training system of embodiment 1 wherein the system is configured to link to one or more remote observers.

In the preceding specification, various embodiments have been described with references to the accompanying drawings. It will, however, be evident that various modifications and changes may be made thereto, and additional embodiments may be implemented, without departing from the broader scope of the invention as set forth in the claims that follow. The specification and drawings are accordingly to be regarded as an illustrative rather than restrictive sense.

We claim:

1. A mobile aircraft training system comprising:
a user interface;
a virtual flight deck display operably configured to the user interface; and
a processor operably linked to the user interface and the virtual flight deck display;
wherein the virtual flight deck display is configured to display a three dimensional representation of an aircraft's controls and indicators from a perspective of an aircraft crew member position wherein the user selects the perspective of the aircraft crew member position;
wherein the user interface is configured to identify an interaction between a user and the aircraft's controls and indicators in the three dimensional representation and to communicate said interaction to the processor and wherein the three dimensional representation is altered based upon said interaction; and
wherein the processor is configured to provide audio and video feedback to the user via the virtual flight deck display based upon the identified interaction between the user and the aircraft's controls and indicators in the three dimensional representation;
wherein the identified interaction between the user and the aircraft's controls and indicators in the three dimensional representation comprises the user's hand movement in the three dimensional representation, the user's eye movement in the three dimensional representation, or any combination thereof; and
wherein the mobile aircraft training system comprises static, pre-programmed sequences for pre-flight, taxi, and in-inflight normal and non-normal scenarios wherein said scenarios are associated with two or more different virtual flight decks and wherein the user selects which of the two or more different virtual flight decks that the user desires training and wherein the system provides a customized user experience to guide a procedure mapping selected from captain training or first officer training and wherein the system does not simulate flight.

2. A mobile aircraft training system of claim 1 wherein the virtual flight deck display is further configured to display a guided sequence of two or more proper interactions between the user and the aircraft's controls and indicators in the three dimensional representation.

3. The mobile aircraft training system of claim 2 wherein the display of the guided sequence comprises audio and video.

4. The mobile aircraft training system of claim 1 wherein the system further comprises a second user interface operably connected to the user interface, the processor, and the virtual flight deck display such that the training system provides crew coordination training, crew resource management training, threat and error management, or any combination thereof.

5. The mobile aircraft training system of claim 1 wherein the virtual flight deck display, the user interface, and the processor are housed in a mobile device selected from a virtual reality headset, a laptop computer, a tablet computer, or a mobile phone.

6. The mobile aircraft training system of claim 1 wherein the virtual flight deck display comprises six degrees of freedom.

7. The mobile aircraft training system of claim 1 wherein the perspective of an aircraft crew member position to the virtual flight deck display is fixed between the user and the virtual flight deck.

8. The mobile aircraft training system of claim 1 wherein the system comprises from one to seven cameras configured to fix the virtual flight deck display to a physical space surrounding a user.

9. The mobile aircraft training system of claim 1 wherein the processor comprises a memory configured to record the interaction between user and the aircraft's controls and indicators.

10. The mobile aircraft training system of claim 1 wherein the virtual flight deck display is further configured to display a guided sequence of two or more proper interactions between the user and the aircraft's controls and indicators in the three dimensional representation and wherein said guided sequence is a program on a mobile device selected from a virtual reality headset, a laptop computer, a tablet computer, or a mobile phone.

11. The mobile aircraft training system of claim 1 wherein the virtual flight deck display is further configured to display a guided sequence of two or more proper interactions between the user and the aircraft's controls and indicators in the three dimensional representation and wherein said guided sequence is streamed to a mobile device selected from a virtual reality headset, a laptop computer, a tablet computer, or a mobile phone.

12. The mobile aircraft training system of claim 1 wherein the virtual flight deck display is further configured to provide audio and video instruction on proper interaction between a user and the aircraft's controls and indicators in the three dimensional representation.

13. The mobile aircraft training system of claim 1 wherein the processor comprises a memory configured to record the interaction between user and the aircraft's controls and indicators and wherein the system is further configured to provide an evaluation to a user based upon the recorded interaction.

14. The mobile aircraft training system of claim 1 wherein the system is configured to use real-time eye tracking and visual and audio directions to train specific gaze actions of a user to complete visual tasks on any one or more procedures comprising normal, non-normal, or emergency procedures.

15. The mobile aircraft training system of claim 1 wherein the system is configured to collect, store, and analyze data relating to a user's eye movement to provide an evaluation to the user based upon the user's eye movement.

16. The mobile aircraft training system of claim 1 wherein the system further comprises a second user interface operably connected to the user interface, the processor, and the virtual flight deck display wherein the system is configured to collect, store, and analyze data relating to a second user's eye movement to provide an evaluation to the second user based upon the second user's eye movement.

17. The mobile aircraft training system of claim 1 wherein the system is configured for adaptive learning and wherein said adaptive learning is conducted in real time.

18. The mobile aircraft training system of claim 1 wherein the system further comprises a video and audio link from a full flight simulator to enable a user to view recorded full flight simulator sessions.

19. The mobile aircraft training system of claim 1 wherein the system is operably linked to a remote content management program.

20. The mobile aircraft training system of claim 1 wherein the system is configured to link to one or more remote observers.

* * * * *